I. ARNOLD.
Friction Clutch.
No. 164,898.  Patented June 29, 1875.
FIG.I.
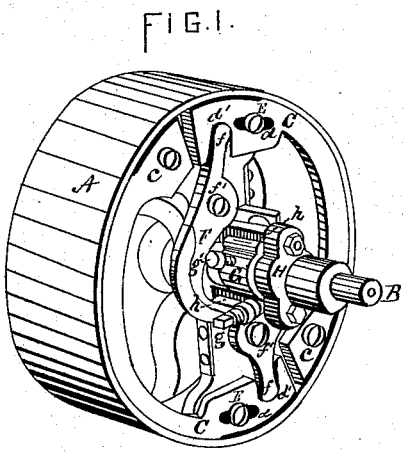
FIG.II.
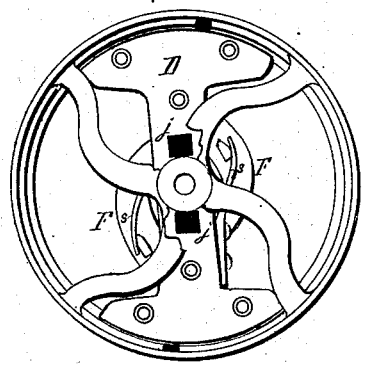
FIG.III.
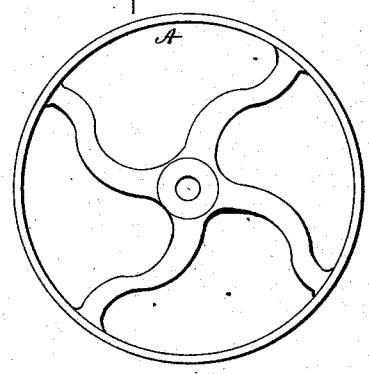
FIG.IV.
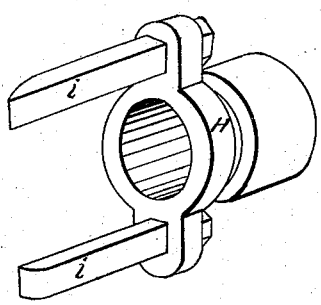
WITNESSES
F. B. Townsend
Will. H. Moxon
INVENTOR.
Irving Arnold
Per. Attys.
A. H. Evans & Co
THE GRAPHIC CO.PHOTO-LITH.39 & 41 PARK PLACE,N.Y.

UNITED STATES PATENT OFFICE.

IRVING ARNOLD, OF FITCHBURG, MASSACHUSETTS.

IMPROVEMENT IN FRICTION-CLUTCHES.

Specification forming part of Letters Patent No. 164,898, dated June 29, 1875; application filed June 9, 1875.

*To all whom it may concern:*

Be it known that I, IRVING ARNOLD, of Fitchburg, Massachusetts, have invented certain new and useful Improvements in Friction-Clutches, of which the following is a full, clear, and exact description, reference being had to the accompanying drawings, making a part of this specification, in which—

Figure 1 is a perspective view of a clutch with my improvements attached. Fig. 2 is an elevation, showing the opposite side of the clutch with pulley removed. Fig. 3 is a detached view of pulley. Fig. 4 is a perspective view of the sleeve detached.

My invention relates to that class of friction-pulleys designed for starting, stopping, and reversing rotary motion; and it consists in the novel construction and combination of parts, as hereinafter described and claimed.

To enable others skilled in the art to make and use my invention, I will proceed to describe the exact manner in which I have carried it out.

In the drawings, A represents a pulley, which runs loosely on the shaft B. Fitting snugly within the pulley are the ring-segments C C, pivoted at c c to the cross-plate D, and having their opposite ends slotted, as shown at d and d'. In the slots d are fitted the bolts E, which screw into the plate D, while the short arms f of the levers F fit into the slots d'. These levers are pivoted to the plate D at f', and at the end of the long arms are provided with the adjusting-screws g g. Rigidly attached to the plate D is the hub G, provided with the thumb-screw g' and the shoulders h h, as shown in Fig. 1. The sleeve H (see Fig. 4) fits loosely on the shaft B, and is provided with the two beveled arms i i, which, passing in between the shoulders h h and the adjusting-screws g g, fit in the slots j j in the cross-plate D.

The operation of my clutch is as follows:

Supposing the pulley A to be running loosely on the shaft B, and it is desired to tighten or clutch it to the shaft, the sleeve H, by means of a shipper-rod or otherwise, is moved up in contact with the hub G, the beveled arms i i passing in between the shoulders h h and the adjusting-screws g g, and widening the space between them. This action forces out the long arms of the levers F F, and, by means of the short arms f f, forces apart the ring-segments C C, guided by the bolts E working in the slots d. The necessary result is the expanding of the ring-segments until they completely fill and clutch the pulley.

Attached to the edges of the cross-plate D are the springs s s, bearing against studs on the inner side of the levers F F.

When it is desired to release the pulley from the clutch, it is only necessary to withdraw the sleeve H, and as the arms i i are withdrawn from their position between the shoulders h h and the adjusting-screws g g, the springs s s force back the levers, and the ring-segments are again closed, which, reducing the diameter of the clutch, releases the pulley.

I am aware that it is not new to operate a friction-clutch by means of pivoted segments and sleeves provided with beveled arms, and this is not my invention.

Having thus described my invention, what I claim as new, and desire to secure by Letters Patent, is—

The pivoted ring-segments C C, provided with the slots d and d', in combination with the adjustable levers F and sleeve H, provided with the beveled arms i i, all constructed to operate substantially in the manner described, and for the purpose set forth.

IRVING ARNOLD.

Witnesses:
EDWARD B. SAWTELL,
T. K. WARE.